May 21, 1968  A. DOUTRE  3,384,737
ELECTRIC STOVE WITH HEATING METALLIC PLATES
Filed April 14, 1965

INVENTOR
Adelard DOUTRE

By Pierre Lesperance

AGENT

3,384,737
ELECTRIC STOVE WITH HEATING METALLIC PLATES
Adelard Doutre, 4805 Des Erables St., Montreal, Quebec, Canada
Filed Apr. 14, 1965, Ser. No. 448,104
1 Claim. (Cl. 219—460)

ABSTRACT OF THE DISCLOSURE

A hot plate type electric stove for cooking having a sheet metal frame with a rectangular depression, and a layer of asbestos material, and two refractory plates disposed thereon, the upper refractory plates having grooves and heating coils therein. The assembly including air inlets in the bottom of the depression at one end and the top plate having vents at one end. The space between the refractory plates and space between the upper refractory plate and metal plate providing a conduit for the continuous circulation of air by convection induced by heat from the coils.

---

The present invention relates to an electric stove, or range, for domestic use and, more particularly, to a heating unit for such stoves, which is covered with a heating metal plate.

In conventional electric ranges or stoves, the electric resistance elements are either exposed to the atmosphere or completely enclosed within metal tubes and said elements often burn by oxydation or by over-heating.

Moreover, in these electric stoves there is a loss of heat produced by radiation and convection of the heat towards the refractory support for the electric heating wires. Furthermore, these conventional stoves cool off rather quickly upon cutting off of the electric supply, and it is therefore necessary to continue the supply of electricity to keep the food hot. Moreover, in conventional electric stoves, the refractory supports for the electric heating elements often break, due to their composition.

The general object of the present invention resides, therefore, in the provision of an electric stove heating unit provided with means to obviate the above-noted disadvantage.

The main object of the present invention resides in the provision of a heating unit for an electric stove, which has a metal plate covering and protecting the electric heating elements.

Another object of the present invention resides in the provision of a heating unit of the character described, in which the heating cover plate is supported by refractory supports arranged in such a manner that there is air circulation provided between the refractory supports and around the electric heating elements to prevent overheating of said elements and to further recuperate, by heat exchange, the heat stored within the refractory supports and to bring said heat in contact with the metal cover plate.

The afore-mentioned air circulation results also in keeping the cover plate hot for a long time after cutting off of the electric supply, because practically all of the heat is extracted from the refractory support plates.

Another object of the present invention resides in the provision of refractory support plates, of a novel composition and of long life.

Figure 2:
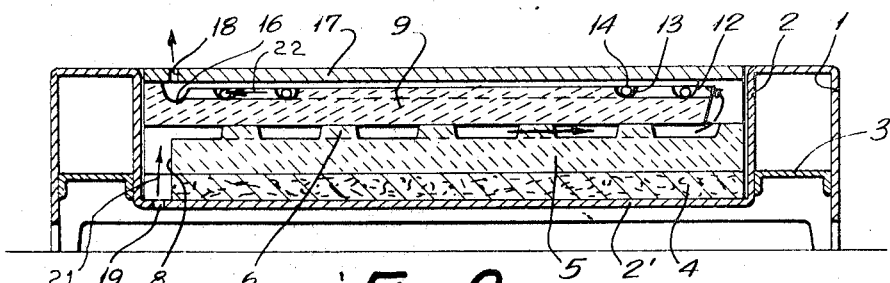
Figure 3:
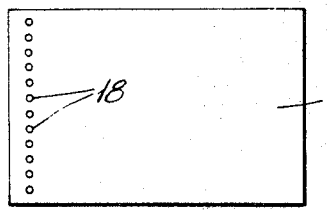
Figure 4:
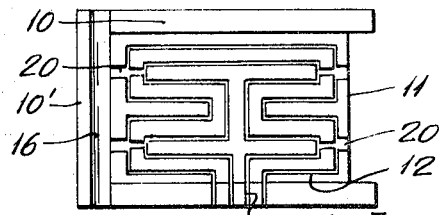
Figure 1:
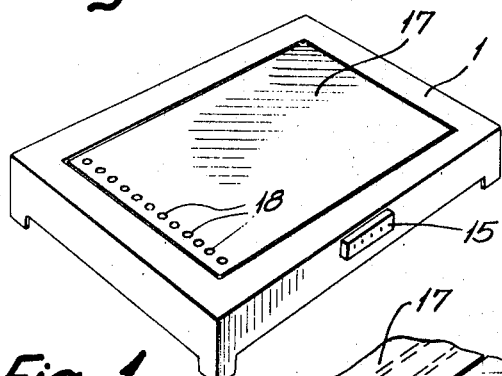
Figure 5:
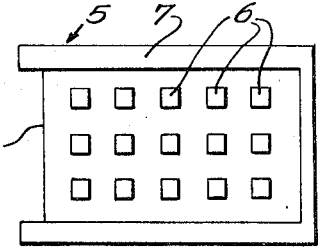
Figure 6:
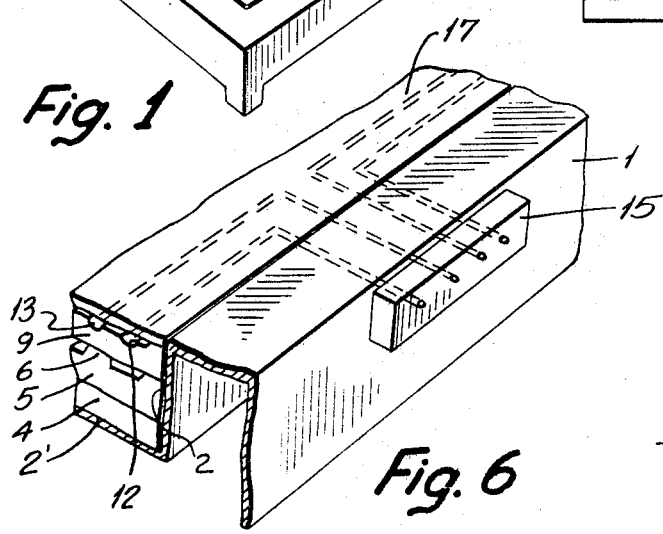

The foregoing objects and other objects of the present invention will become more apparent during the following disclosure and by referring to the annexed drawings, in which:

FIGURE 1 is a perspective view of a stove in accordance with the invention;

FIGURE 2 is a longitudinal section of the stove;
FIGURE 3 is a top plan view of the metal cover plate;
FIGURE 4 is a top plan view of the upper refractory support plate;
FIGURE 5 is a top plan view of the lower refractory support plate; and
FIGURE 6 is a partial perspective view and partial cutaway view of the stove in accordance with the invention.

Referring now more particularly to the drawings in which like reference characters indicate like elements throughout, the stove shown in the drawings is of the portable type, which can be placed on a table or other elevated support, but the heating unit of the invention can also be used in electric ranges resting on a floor.

The stove comprises a frame 1 forming a cavity defined by side walls 2 and a bottom wall 2', the side walls 2 being reinforced by braces 3. A heat-insulating and non-combustible material, shown at 4, in loose fibre or flake form, such as asbestos, covers the bottom wall 2' and supports in turn a lower refractory support plate 5, of generally rectangular shape and provided at its top face with upwardly extending substantially evenly spaced studs 6 and with a marginal rib 7, the top face of which is at the same level as the top face of the stud 6.

Rib 7 extends along three sides of the refractory plate 5, while the remaining short side is devoid of rib 7 and forms a recess 8. An upper refractory plate 9 rests on the lower refractory plate 5 and is also of rectangular shape and has the same dimensions as plate 5.

Upper refractory plate 9 is provided with upwardly directed marginal flanges 10, 10' extending on three sides at the top face of the plate 9 and higher than the remaining portion of the top face of said plate 9; the remaining short side of plate 9 forms a recess 11.

In the remaining portion of the top face of the plate 9, are formed serpentine exterior grooves 12 and interior grooves 13, which serve to receive electric heating wires 14, wound in spirals and of conventional construction.

The heating wires are connected to an electric supply cord, not shown, in a connection box 15 secured to the exterior of frame 1.

The marginal transverse flange 10' is provided at its top face with a groove 16 extending the entire length thereof. A metal cover plate 17, of rectangular shape and of substantially the same dimensions as refractory plates 5 and 9, rests on flanges 10 and 10' of plate 9.

Metal plate 17 is preferably made of aluminum, or other metal, which is highly heat-conducting. Cover plate 17 is provided at one of its ends with a transverse row of through holes 18 in register with transverse groove 16. Moreover, the bottom 2' of the cavity of the frame 1 is provided with a series of holes 19 communicating with the chamber defined by the recessed end 8 of the lower refractory plate 5.

Plate 9 is disposed on top of plate 5 such that recessed end 11 is away from recessed end 8 of plate 5.

Plate 9 is further provided with grooves 20 making a communication between transverse groove 16 and the serpentine grooves 12 and 13, and also making communication between said grooves 12 and 13 and recessed end 11 of the plate 9.

When one or more of the two electric heating wires 14 are supplied with electricity, the heat generated causes, by convection, air circulation in the following manner: fresh air enters through holes 19 of bottom wall 2' into the chamber defined by recessed end wall 8 of bottom plate 5 and moves upwardly in accordance with arrow 21, then horizontally between the lower and upper refractory plates 5 and 9 around studs 6 to the other end of the two refractory plates, then circulates back in the space between the underface of metal cover plate 17 and the top face of refractory plate 9, in the area between flanges 10, in accordance with arrow 22; air also circulates through the grooves 12 and 13, due to the communicating grooves 20, to thereby circulate around electric heating wires 14. Air escapes finally through groove 16 and holes 18 of metal plate 17.

Refractory plates 5 and 9 are preferably made of a mixture of ciment fondu and burned fully dehydrated clay. Ciment fondu is a hydraulic binder having a high percentage of alumina and which can resist to temperatures up to 2,500 degrees Fahrenheit; it is used in the manufacture of refractories.

The burned fully dehydrated clay is a silica alumina clay which has refractory properties and can be used up to 2,500 degrees Fahrenheit. It normally serves as an aggregate in mortars and cement for high temperature use in accordance with definite proportions and definite particle size.

The above-mentioned mixture preferably consists of four parts of ciment fondu and five parts of burned completely dehydrated clay. The resulting mixture is a refractory material which can be used up to 2,500 degrees Fahrenheit.

As an alternate composition for refractory plates 5 and 9, it is also possible to use lime aluminate, such as the one commonly known under the registered trademark "Secar 250," owned by Ciment Fondu Lafarge (Canada) Limited, and a frefractory aggregate consisting mainly of kaolin or malachite, in order to form a cement or mortar having refractory properties capable of resisting to temperatures of up to 3,000 degrees Fahrenheit.

Metal cover plate 17 protects heating elements 14 against contact with liquids or food and forms an easily washable surface. Moreover, any liquid which might fall through holes 18 cannot come in contact with heating wires 14, because the liquid would remain in transverse groove 16 and finally evaporate.

Controlled air circulation around heating elements 14 prevents overheating of said elements and increases their service life. This is also achieved because excessive oxidation of said elements is prevented due to the fact that elements 14 are not directly exposed to the ambient air.

Air circulating around elements 14 is pre-heated because it passes between refractory plates 5 and 9 and is in heat-exchange relationship therewith. This heat exchange enables to recuperate the heat contained in plates 5 and 9, which otherwise would be lost. This recuperated heat is in turn given up to cover metal plate 17, because the circulating air comes in heat-exchange relationship therewith.

Although the path shown in the drawing for the air circulation is in the form of a zigzag from one end to the other of the cover plate 17 and refractory plates 5 and 9, it is understood that one can provide other paths for the air circulation, and that holes 18 and 19 can be located at some other points.

It is also possible to provide a stove which would be provided with a single refractory plate and a cover metal plate, with air circulation therebetween.

It is also possible to make plate 17 thicker, or to provide two or more superposed metal cover plates.

While a preferred embodiment in accordance with the invention has been illustrated and described, it is understood that various modifications may be resorted to without departing from the spirit and scope of the appended claim.

What I claim is:

1. In an electric stove for cooking food and the like, a frame having a cavity comprising a bottom and side walls, a refractory support plate disposed in said cavity and having an upstanding marginal rib along two sides and one end, and a plurality of centrally located upstanding studs, the studs and rib being of like height, said support plate having a recess at its other end communicating with air inlet apertures in the recess bottom, an electric heating unit comprising a second refractory plate supported upon the side ribs and studs of the support plate and having a recess at its one end over the end rib of the support plate, said second plate having grooves in the top surface thereof, extending to the end recess of the second plate and having upstanding side flanges and an end flange at the other end of said second plate, an electric heating wire disposed in the grooves, a metal plate covering said second plate and supported on said end and side flanges, said metal plate having vents disposed adjacent to and inside said end flange and communicating with the space between said second and metal plates, whereby the air inlet apertures, end recesses, air passages between the support and second plate and metal plate and vents provide a continuous path from inlet apertures to the vents for the convection flow of air between the support and second plate, and second plate and metal plate.

References Cited

UNITED STATES PATENTS 1,990,640 2/1935 Doherty _____ 219—464

FOREIGN PATENTS 361,768 10/1922 Germany.
711,350 6/1965 Canada.

OTHER REFERENCES

A. J. Griner Company, Laboratory Apparatus, January 1957.

RICHARD M. WOOD, *Primary Examiner.*

L. H. BENDER, *Assistant Examiner.*